(12) United States Patent
Pantsar et al.

(10) Patent No.: US 9,463,960 B2
(45) Date of Patent: Oct. 11, 2016

(54) LIFTING HOOK AND SAFETY LATCH FOR LIFTING HOOK

(71) Applicant: Konecranes Plc, Hyvinkää (FI)

(72) Inventors: Ville Pantsar, Helsinki (FI); Risto Vilppo, Tampere (FI); Pekka Helenius, Riihimäki (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 0 days.

(21) Appl. No.: 14/400,649

(22) PCT Filed: May 15, 2013

(86) PCT No.: PCT/FI2013/050528
§ 371 (c)(1),
(2) Date: Nov. 12, 2014

(87) PCT Pub. No.: WO2013/171375
PCT Pub. Date: Nov. 21, 2013

(65) Prior Publication Data
US 2015/0130199 A1    May 14, 2015

(30) Foreign Application Priority Data
May 15, 2012    (FI) ..................................... 20125518

(51) Int. Cl.
*B66C 1/36*    (2006.01)
*F16B 45/02*    (2006.01)

(52) U.S. Cl.
CPC *B66C 1/36* (2013.01); *F16B 45/02* (2013.01)

(58) Field of Classification Search
CPC ........... B66C 1/34; B66C 1/36; F16B 45/02; F16B 45/025
USPC ....................... 294/82.19, 82.2, 82.21, 82.33
See application file for complete search history.

(56) References Cited

U.S. PATENT DOCUMENTS

| 1,457,648 | A | * | 6/1923 | Bailey | 294/82.19 |
| 1,711,346 | A | * | 4/1929 | Greve | 294/82.19 |
| 4,767,144 | A | * | 8/1988 | Hornberg | 294/82.36 |

(Continued)

FOREIGN PATENT DOCUMENTS

| JP | 53-44869 U | 4/1978 |
| JP | 9-104585 A | 4/1997 |
| SE | 447085 B | 10/1986 |

*Primary Examiner* — Dean Kramer
(74) *Attorney, Agent, or Firm* — Birch, Stewart, Kolasch & Birch, LLP

(57) ABSTRACT

A lifting hook includes a hook body with a hook stem; a tip; a safety latch with a fastening end and a free latch end, the fastening end being pivotally fastened close to the stem for movement between an open and a closed position, the safety latch being in the open position substantially against the inside of the hook body in a position that leaves the hook jaw open while in a closed position the latch end extends across the hook jaw to the tip of the hook, closing the jaw from the inside; and an actuator of the safety latch arranged between the safety latch and the hook stem, the actuator of the safety latch including a delay mechanism configured to return the safety latch from the open position to the closed position in a delayed manner. A safety latch of a lifting hook is also provided.

22 Claims, 6 Drawing Sheets

(56) References Cited

U.S. PATENT DOCUMENTS

| | | |
|---|---|---|
| 5,577,787 A | 11/1996 | Klope |
| 5,609,378 A | 3/1997 | Bowers et al. |
| 5,636,888 A * | 6/1997 | Kiser et al. ............... 294/82.19 |
| 5,687,931 A * | 11/1997 | Hogan ..................... 244/151 B |
| 7,887,110 B2 * | 2/2011 | Cheng et al. ............. 294/82.17 |

* cited by examiner

LIFTING HOOK AND SAFETY LATCH FOR LIFTING HOOK

BACKGROUND OF THE INVENTION

The invention relates to a lifting hook comprising a hook body with a hook stem and a hook tip; a safety latch with a fastening end and a free latch end, the fastening end of the latch being pivotally fastened close to the hook stem to be moved between an open and a closed position, the safety latch being in its open position substantially against an inner side of the hook body in a position that leaves the hook jaw free while in the closed position of the safety latch the latch end extends across the hook jaw to the tip of the hook and against it, the latch end resting against the inside of the hook body and its jaw, closing the jaw; and actuating means of the safety latch arranged between the safety latch and the hook body. The invention also relates separately to a safety latch to be attached to existing hooks, in which case the safety latch is of the above-described type.

A safety latch of a lifting hook is meant to assist the user of a lifting hook of a crane in safe and efficient loading and unloading of the hook. The loading of the hook naturally refers to fastening a load to the hook and the Unloading, correspondingly, to releasing the load from the hook. Safety and efficiency are significantly increased if the user is able to use both hands at the same time for releasing the load.

In prior art hooks, the safety latch is typically pressed open against a spring force that pushes the safety latch to close it, and kept in the open position by one hand. This prevents the hand from being used for releasing the load as the hand must be used for keeping the safety latch open all the time when the load is being released. Moreover, opening the safety latch of big hooks and keeping it open requires a lot of force. Hence the load is very difficult to release and often another person is needed to keep the safety latch open. There is also a risk of hands or fingers getting caught between the safety latch and the hook body. All of these aspects together may lead to a temptation to ignore the use of the safety latch, for example by tying it permanently to an open position against the inner side of the hook body by taping, for example.

However, methods have been developed for keeping the safety latch open without the user needing to use his/her hands for it. For example, the safety latch may be provided with a kind of an operating handle attached by articulation to the safety latch, at a distance from its fastening end, the handle extending around the hook body and being lockable behind the hook body to a position that keeps the safety latch open. An example of such a safety latch is disclosed in U.S. Pat. No. 3,008,210. In this solution, however, the handle has to be separately released after the load has been detached in order to tension the safety latch again to the closed position. The releasing may require even quite a lot of strength, and if the safety latch has a strong spring, the user may still hurt his/her hands if they for some reason get caught between the operating handle and the hook body or between the latch end of the safety latch and the hook body. Then again, if the safety latch is left or forgotten completely open after a load has been fastened and for the duration of a subsequent lifting, the safety latch is of no use.

SUMMARY OF THE INVENTION

An object of the invention is thus to improve the lifting hook and its safety latch so as to solve the above-mentioned problems. This is achieved by a lifting hook and a safety latch of the invention, primarily characterized in that the actuating means of the safety latch comprise delay means for delayed return of the safety latch from an open position to a closed position. Preferred embodiments of the invention are disclosed in the dependent claims.

The idea of the invention is to provide the safety latch with means for producing force or storing force, the means allowing, when activated, the safety latch to be kept open in a controlled manner.

An advantage of the lifting hook and the safety latch of the invention is that the lifting hook becomes reliable and convenient to operate. The safety latch thus improves safety without invoking in the operating staff any desire to avoid using it or to remove it from the actual lifting apparatus.

The safety latch is returned and the movements of the delay means implemented and triggered using the energy provided by the lifting device user attaching a load to or releasing a load from the hook. According to the invention, the force supplied by the user is stored as energy in an actuator in the vicinity of the hook, thus preferably avoiding the need to supply other external energy.

The storage of energy and its delayed releasing may be based on a natural resistance in the delay member, such as: a machine and its friction; compressed air and restricted release of the air and, correspondingly, pressurized liquid and a restricted flow of the liquid; inertia forces or vortexes of acceleration masses. The energy is used e.g. for generating power or torque for moving the delay means and closing the safety latch.

The actuators are simple and hence their maintenance is easy to arrange, primarily simply by replacing individual parts. If the actuators currently in use are compared e.g. with servo or other similar systems, the reciprocal timing and operation of these systems must often be adjusted when a part of the system is to be replaced by a new one.

A particular advantage of the solution is that the implementation of the safety latch and its delayed open/close action has been achieved with other than electric actuators. Although electric actuators would offer a number of solutions for creating the delay (relays, capacitors, electric engines, etc.), their use in the implementation would require arranging supply of electric energy to the actual hook area. To arrange electricity supply would, in turn, require either controlling the route and length of an electric wire to the hook or at least an accumulator to be placed in connection with the hook. An accumulator would have to be recharged or replaced regularly.

An advantageous alternative is to have the safety latch fastened to the hook as a separate and detachable structure, in which case the hook stem does not need to be changed and thus the original strength of the hook is maintained. In addition, this allows the original hook, which is usually made by forging and therefore a valuable manufactured piece, to be utilized.

LIST OF FIGURES

The invention will now be described in greater detail by means of preferred embodiments and with reference to the accompanying drawings, in which.

DETAILED DESCRIPTION OF THE INVENTION

Figure 1:
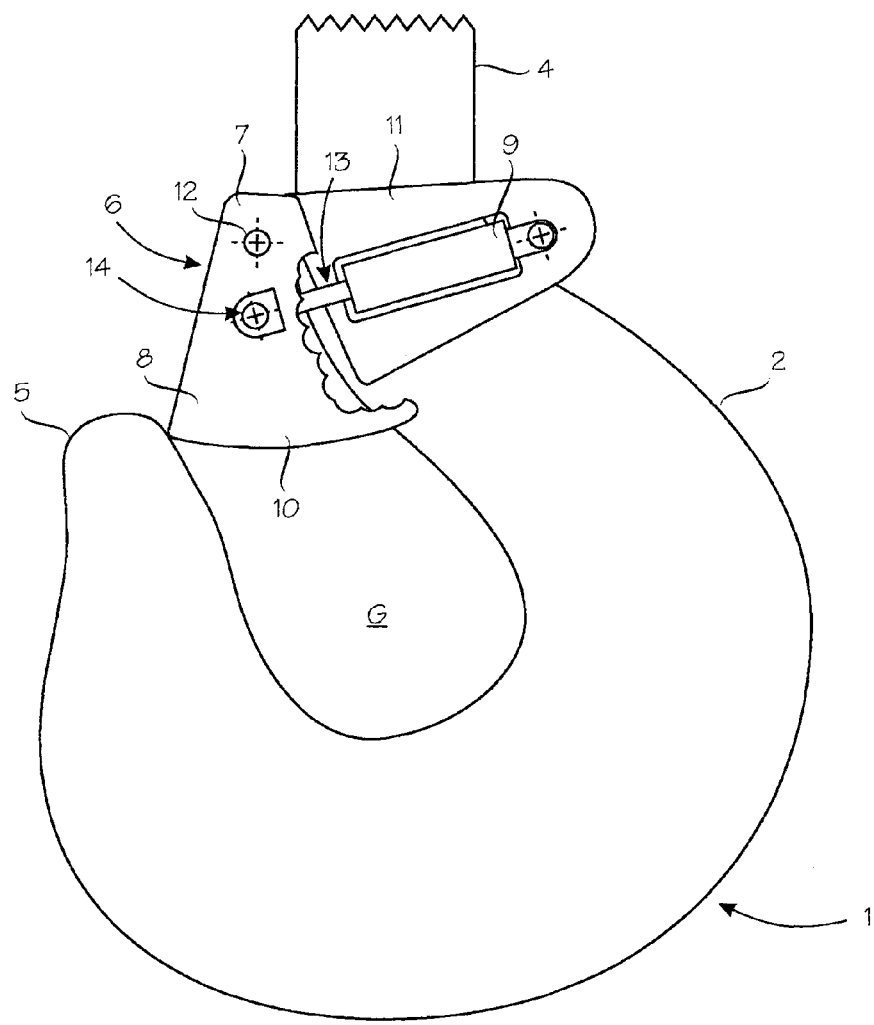
FIG. 1 is a side view of a preferred implementation of a lifting hook of the invention, with its safety latch in a closed position.
Figure 2:
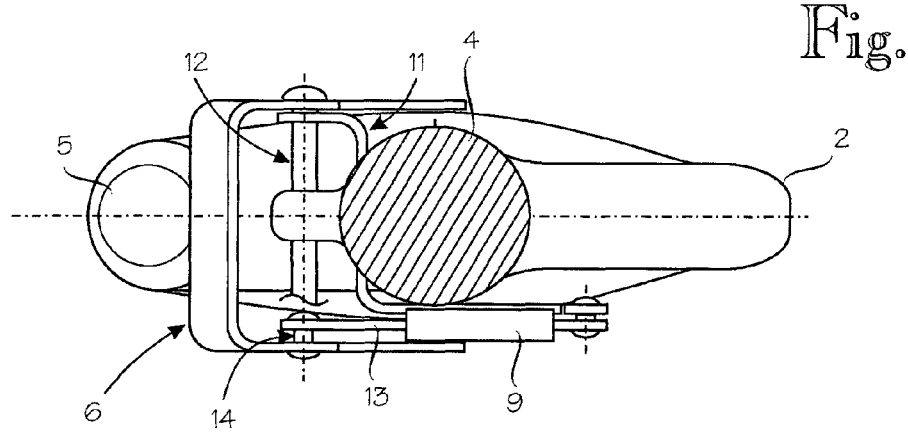
FIGS. 2 and 3 are views from above of the lifting hook of FIG. 1, FIG. 2 being a partly sectional view.

With reference to FIGS. 1 and 2, a lifting hook 1 of the invention comprises a hook body 2 provided with a hook stem 4 and a hook tip 5; a safety latch 6 with a fastening end 7 and a free latch end 8, the fastening end 7 of which is pivotally fastened close to the hook stem 4 to be moved between an open and a closed position, the safety latch 6 being in its open position substantially against the inside of the hook body 2 in a position that leaves the hook jaw G free, while in the closed position of the safety latch 6 the latch end 8 extends across the hook jaw G to the tip 5 of the hook, resting against it on the inside of the hook body 2 and its jaw G and closing the jaw G; and means 9 for actuating the safety latch, arranged between the safety latch 6 and the hook body 2. The actuating means 9 of the safety latch 6 also comprise delay means for returning the safety latch 6 in a delayed manner from the open position to the closed position. In this example the actuating means of the safety latch and the delay means comprise a common damped gas spring or a pneumatic cylinder 9 arranged between the safety latch 6 and the hook body 2, the cylinder forcing the latch end 8 to the closed position in a delayed manner characteristic of this structure.

In this solution the user of the lifting hook simply presses the hook of the safety latch 6 against the stem, and the safety latch 6 then begins to gradually close according to a predetermined delay. The delay is selected so that enough time is left for fastening the load. A suitable delay is from 5 to 10 seconds, for example.

When necessary, in this solution the actuating means of the safety latch might also comprise a spring (not shown) arranged between the safety latch 6 and the hook body 2 to force, primarily or as an additional measure, the latch end 8 to the closed position, in which case the gas spring or the pneumatic cylinder 9 would mainly act as the actual delay means only, to delay the closing of the safety latch 6 caused by the spring.

The gas spring or pneumatic cylinder 9 is at least partly arranged to the inside of the side edges of the safety latch 6, in this case more specifically partly to the inside of one side edge 10 of the safety latch, because the gas spring or cylinder 9 is supported to a support plate 11 fastened at a front end thereof to a fastening shaft 12 arranged to the hook stem 4, the plate extending rearward along a side of the hook stem 4. The end of the support plate 11 of the gas spring or the cylinder 9 at the fastening shaft 12 is bent so that the support plate 11 is fastened to the fastening shaft 12 on an opposite side of the hook stem 4 in relation to the gas spring or the cylinder 9, thus allowing the support plate 11 with the gas spring or the cylinder 9 supported thereto to be pressed more securely against the hook stem 4. The piston rod 13 of the gas spring or the cylinder 9 is fastened by a joint 14 to the inside of the side edge 10 of the safety latch.

In the implementation example of the invention shown in FIGS. 4 to 7, the actuating means of the safety latch 106 comprise a spring 3 arranged to the fastening shaft 12, between the safety latch 106 and the hook body 2, the spring forcing the latch end 108 to the closed position, and the delay means of the actuating means formed by the spring 3 comprise a locking and release member arrangement for the safety latch 106, to be described below, the arrangement moving transversally in relation to the movement of the safety latch 106 and releasing the safety latch 106 locked thereto according to a predetermined delay.

Thus, with further reference to the figures, the fastening shaft 12 of the safety latch 106 arranged to the lifting hook stem 4 is provided with support plates 110 and 111 extending rearward on both sides of the hook stem 4. Between the support plates 110 and 111, behind the hook stem 4, there is arranged a transverse delay cylinder 112 parallel with the fastening shaft of the safety latch, the piston rod 113 of which is arranged to extend through a hole 114 made to one support plate 110. In that case the projecting end of the piston rod 113 is provided with a press button extension 115, an associated thick piston rod portion 116, whose diameter is substantially equal to the diameter of said hole 114, a conically narrowing portion 117 after the thick portion 116 and a thin piston rod portion 118 associated with the narrowing portion 117. Mounted on bearings on the surface of the support plate 110 provided with the hole 114 there is a locking cam plate 119 pivoting in the direction of the surface, a locking cam 120 of the plate being arranged to be capable of cooperation with a locking slot 121 provided in the side edge on the same side of the safety latch 106 while on the opposite side in relation to a bearing shaft 122 of the plate there is a hole 123 coinciding with the hole 114 of the support plate 110 and having a shape conforming to that of the hole 114 in the support plate 110 and that of the thick piston rod portion 116. In addition, a spring 124 is arranged between the bearing shaft 122 and the locking cam plate 119 to force the locking cam 120 to a releasing direction from the locking slot 121. The arrangement thus operates as follows: when the piston rod 113 of the delay cylinder 112 is pressed in and the locking cam 120 co-operates with the locking slot 121 (the user of the hook sets them into this state), the safety latch 106 remains in the open position but is released to the closed position when the thin piston rod portion 118 of the delay cylinder 112 reaches the hole 123 in the locking cam plate 119, causing the locking cam 120 to be released from the locking slot 121.

Figure 8:
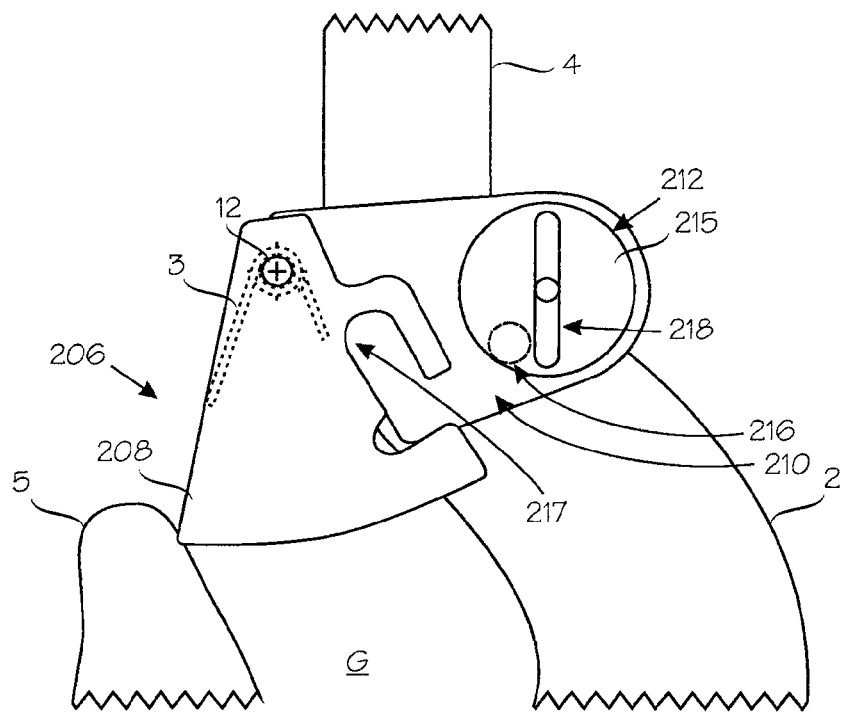
FIG. 8 is a side view of yet another preferred implementation of the lifting hook of the invention with its safety latch in an open position.
Figure 9:
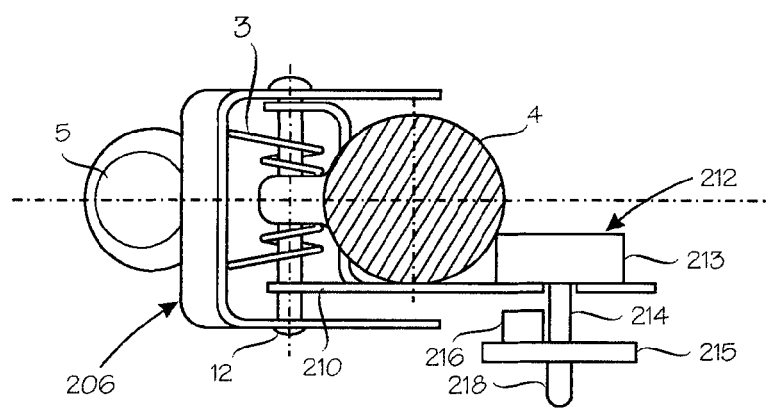
FIG. 9 shows the safety latch of FIG. 8 in a closed position.
Figure 10:
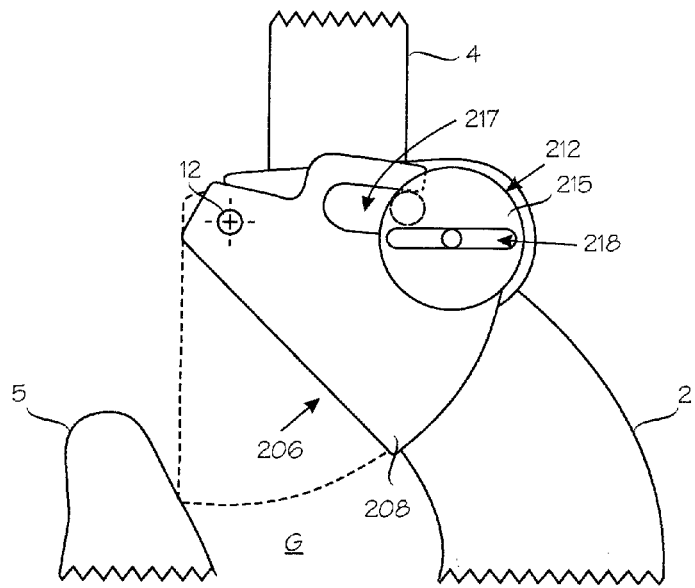
FIG. 10 is a view from above of the lifting hook of FIGS. 8 and 9.

In the implementation example of the invention shown in FIGS. 8 to 10, the actuating means of the safety latch comprise a spring 3 arranged between the safety latch 206 and the hook body 2 to force the latch end 208 to the closed position, and the delay means of the actuating means comprise a mechanical pivot mechanism 212 arranged to co-operate with the safety latch 206 and releasing the safety latch 206 locked thereto according to a predetermined delay.

In that case the fastening shaft 12 of the safety latch 206 mounted to the hook stem 4 is provided with a support plate 210 extending along a side of the hook stem 4. On the rear part of the support plate 210 there is provided a mechanical pivot mechanism 212, the body 213 of the mechanism being fastened to the rear surface of the support plate 210. Projecting from the mechanism body 213 to the front side of the support plate 210 there is a pivot shaft 214 and, fastened to the pivot shaft 214, there is a dished plate 215 having a tension and locking pin 216 fastened to the edge of its inner surface for the pivoting delay mechanism included in the mechanism body 213. Correspondingly, formed to the side edge on the same side of the safety latch 206 there is a shaped locking groove 217 arranged to co-operate with the pivot shaft 214 and the tension and locking pin 216, the pivot mechanism 212 being released from the locking groove 217 after a delay determined by the pivot mechanism 212. In other words, the pivot mechanism 212 is tensioned by pressing the safety latch 206 towards the stem 2, which causes the tension and locking pin 216 to slide in the locking groove 217, and the safety latch 206 becomes locked to an open rear position. During the subsequent delayed closing of the safety latch 206 the tension and locking pin 26 begins to turn along the locking groove 217 until it is released at an open section of the locking groove 217.

The above-described safety latch 206 can also be locked by a turnbutton 218 arranged onto the outer surface of the dished plate 215.

Figure 11:
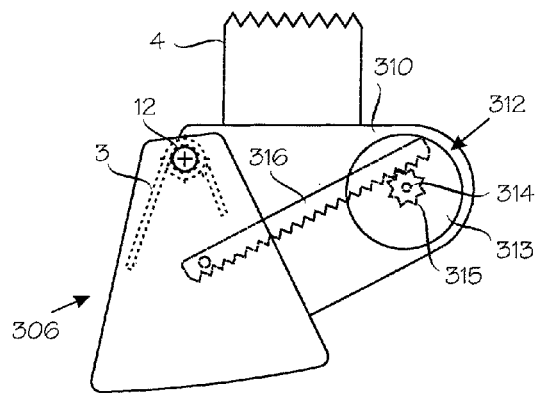
FIGS. 11 and 12 show some other possible alternatives for implementing a lifting hook of the invention.

FIG. 11 shows another arrangement based on a pivot mechanism and also having a support plate 310 arranged to a fastening shaft 12 of a safety latch 306 mounted to the hook stem 4, the plate extending along one side of the hook stem 4. Further, on the rear portion of the support plate 310 there is provided a mechanical pivot mechanism 312, the body 313 of the mechanism being fastened to the rear surface of the support plate 310, a pivot shaft 314 projecting from the mechanism body 313 to the front side of the support plate 310. However, the pivot shaft 314 has a cogwheel 315 fastened thereto and co-operating with a toothed bar 316 fastened to a side edge on the same side of the safety latch 306, and as the toothed bar 316 advances on the cogwheel 315 as determined by the pivot mechanism 312, the safety latch closes 306.

Figure 12:
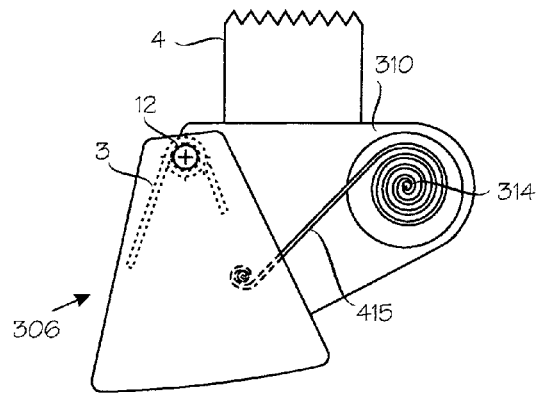

Alternatively, the arrangement of FIG. 11 based on the cogwheel 315 and the toothed bar 316 may be replaced as shown in FIG. 12 by fastening to the pivot shaft 314 a band 415 winding onto it, one end of the band being fastened to the side edge on the same side of the safety latch 306 so that when unwinding from the pivot shaft 314, the band closes the safety latch 306 according to a predetermined delay.

Figure 3:
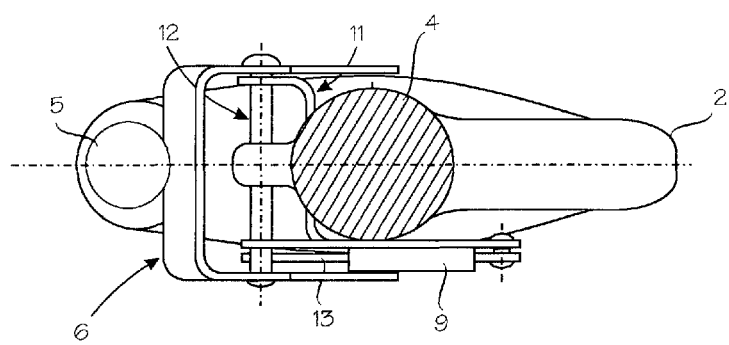
Figure 4:
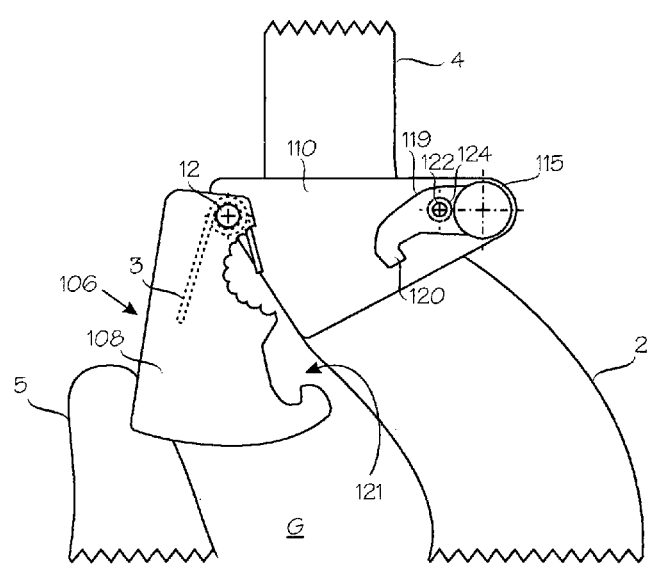
FIG. 4 is a side view of another preferred implementation of the lifting hook of the invention with its safety latch in a closed position.
Figure 5:
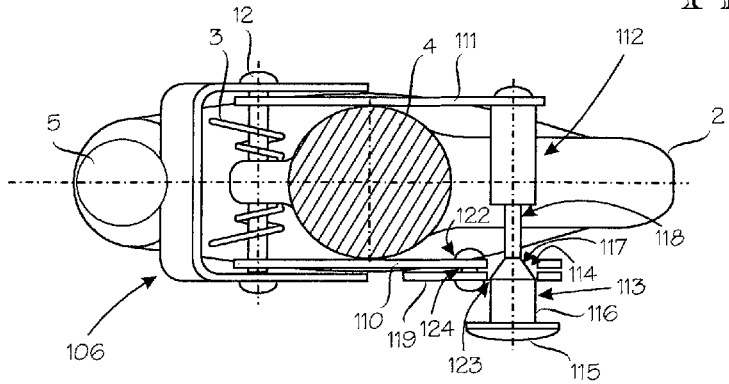
FIG. 5 is a view from above of the lifting hook of FIG. 4.
Figure 6:
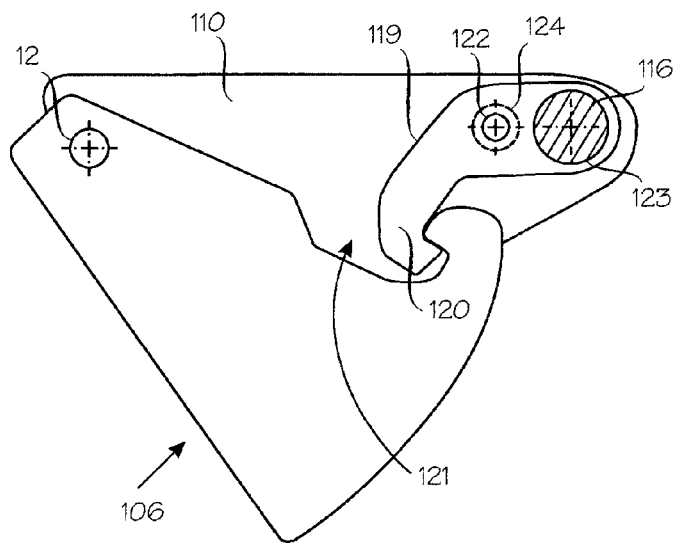
FIGS. 6 and 7 show the safety latch of FIGS. 4 and 5 in a closed and an open position, without showing the hook.
Figure 7:
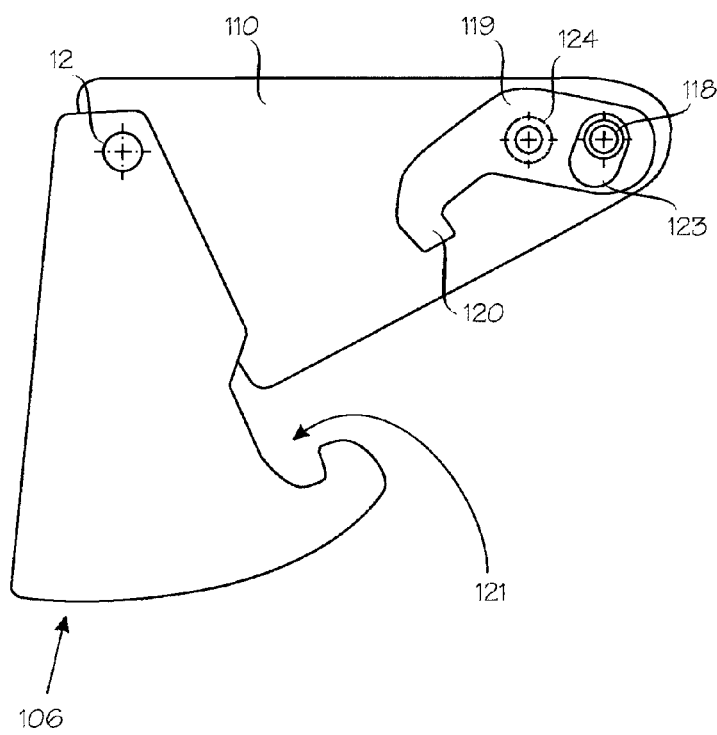
Figure 13:
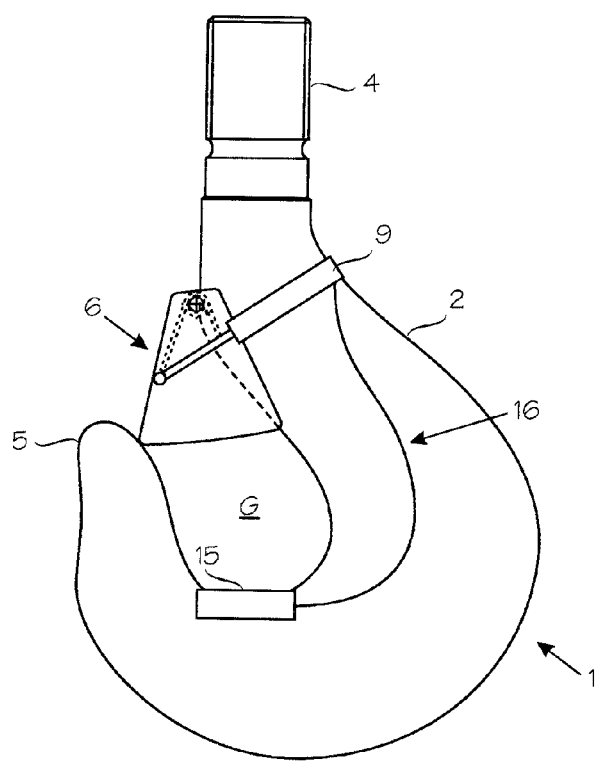
FIG. 13 shows an implementation of a safety latch of the invention in which the safety latch of the lifting hook is associated with a means for detecting a load on the lifting hook.

In the implementation of FIG. 13 the delay means of the actuating means further comprise a load detector 15 arranged to the bottom of the hook body 2 for immediately releasing the safety latch 6 when the load detector 15 becomes activated due to a load attached to the hook 1. The load detector 15 is arranged to become activated by a load causing a pressure to its top surface. The load detector 15 is connected by to the gas spring or cylinder 9 disclosed in FIGS. 1 to 3 by a wire 16, for example, for indicating load detection and for subsequent rapid releasing of the safety latch 6.

Figure 14:
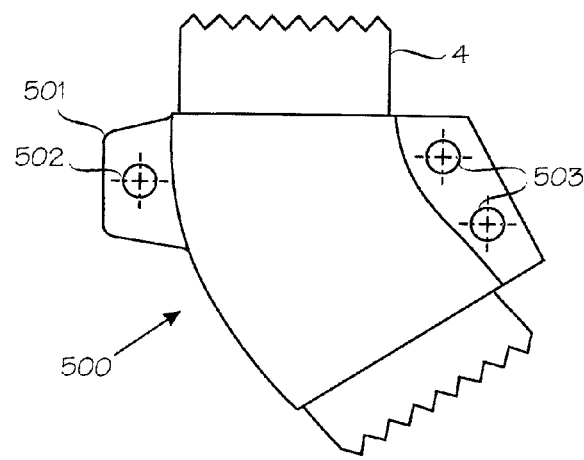
FIGS. 14 and 15 show a band structure allowing the safety latch of the invention to be fastened to conventional lifting hooks not provided with a safety latch.
Figure 15:
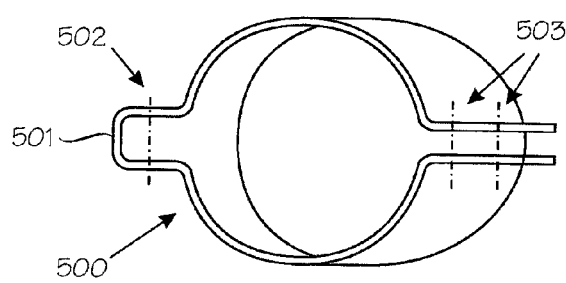

All the safety latch structures disclosed above may be fastened, at least when suitably modified, by means of the mounting portion 500, for example, disclosed in FIGS. 14 and 15 also to many existing lifting hooks that have no mounting hole on the front portion of the stem for the fastening shaft 12 of the safety latch. This mounting portion example is formed of a band 500 to be fastened around the top part of the lifting hook stem 4 or the hook body 2 and having a hole 502 arranged to a bent front protrusion 501 thereof for the fastening shaft 12 of the safety latch. The disclosed mounting part 500 represents only one example, and with the mounting portions the details of the safety latches to be fastened may be suitably modified in accordance with the mounting part and the lifting hook to be used.

The above description of the invention is only intended to illustrate the basic idea of the invention. A person skilled in the art may thus vary its details within the scope of the accompanying claims.

The invention claimed is:

1. A safety latch to be used in a lifting hook having a hook body with a hook stem and a hook tip, the hook body and the hook tip defining a hook jaw therebetween,
    the safety latch being arrangeable to a mounting part arranged to be fastened close to the hook stem and the safety latch being provided with a fastening end and a free latch end, the fastening end of the latch being pivotally fastened to the mounting part to be moved between an open and a closed position, the safety latch being in its opened position substantially against an inner side of the hook body in a position that leaves the hook jaw free while in the closed position of the safety latch the latch end extends across the hook jaw to the tip of the hook, resting against it on the inner side of the hook body and its jaw, and closing the jaw; and
    an actuator of the safety latch arranged between the safety latch and the hook body,
    wherein the actuator of the safety latch comprises a delay mechanism configured to return the safety latch from the open position to the closed position in a delayed manner, tensioning of the delay mechanism to produce the energy required to return the delay mechanism being arranged to be carried out by the user and by a force produced by the user,
    wherein the actuator of the safety latch and the delay mechanism comprise a common damped gas spring or pneumatic cylinder arranged between the safety latch and the mounting part or the hook body to force the latch end to the closed position in a delayed manner, and
    wherein the damped gas spring or pneumatic cylinder is at least partly arranged inside side edges of the safety latch and the gas spring or cylinder is supported to a support plate fastened at the front end thereof to a fastening shaft of the safety latch arranged to the mounting part and extending rearward along a side of the hook stem.

2. The safety latch as claimed in claim 1, wherein the damped gas spring or pneumatic cylinder is substantially enclosed inside the safety latch.

3. The safety latch as claimed in claim 1, wherein the mounting part comprises a band to be fastened around the lifting hook stem or the top part of the hook body, a bent projection made to the band being provided with a hole for the fastening shaft of the safety latch.

4. A lifting hook comprising:
    a hook body with a hook stem and a hook tip, the hook body and the hook tip defining a hook jaw therebetween; and
    the safety latch according to claim 1.

5. A safety latch to be used in a lifting hook having a hook body with a hook stem and a hook tip, the hook body and the hook tip defining a hook jaw therebetween, the safety latch being arrangeable to a mounting part arranged to be fastened close to the hook stem and the safety latch being provided with a fastening end and a free latch end, the fastening end of the latch being pivotally fastened to the mounting part to be moved between an open and a closed position, the safety latch being in its opened position substantially against an inner side of the hook body in a position that leaves the hook jaw free while in the closed position of the safety latch the latch end extends across the hook jaw to the tip of the hook, resting against it on the inner side of the hook body and its jaw, and closing the jaw; and an actuator of the safety latch arranged between the safety latch and the hook body, wherein the actuator of the safety latch comprises a delay mechanism configured to return the safety latch from the open position to the closed position in a delayed manner, tensioning of the delay mechanism to produce the energy required to return the delay mechanism being arranged to be carried out by the user and by a force produced by the user, and wherein the actuator of the safety latch comprises a spring arranged between the safety latch and the mounting body to force the latch end to the closed position, and the delay mechanism of the actuator comprises a locking and release member of the safety latch, the member moving transversally in relation to the movement of the safety latch and releasing the safety latch locked thereto according to a predetermined delay.

6. A lifting hook comprising:

a hook body with a hook stem and a hook tip, the hook body and the hook tip defining a hook jaw therebetween; and the safety latch according to claim 5.

7. The safety latch as claimed in claim 5, wherein the mounting part comprises a band to be fastened around the lifting hook stem or the top part of the hook body, a bent projection made to the band being provided with a hole for the fastening shaft of the safety latch.

8. A safety latch to be used in a lifting hook having a hook body with a hook stem and a hook tip, the hook body and the hook tip defining a hook jaw therebetween, the safety latch being arrangeable to a mounting part arranged to be fastened close to the hook stem and the safety latch being provided with a fastening end and a free latch end, the fastening end of the latch being pivotally fastened to the mounting part to be moved between an open and a closed position, the safety latch being in its opened position substantially against an inner side of the hook body in a position that leaves the hook jaw free while in the closed position of the safety latch the latch end extends across the hook jaw to the tip of the hook, resting against it on the inner side of the hook body and its jaw, and closing the jaw; and an actuator of the safety latch arranged between the safety latch and the hook body, wherein the actuator of the safety latch comprises a delay mechanism configured to return the safety latch from the open position to the closed position in a delayed manner, tensioning of the delay mechanism to produce the energy required to return the delay mechanism being arranged to be carried out by the user and by a force produced by the user, wherein a fastening shaft of the safety latch arranged to the mounting part is provided with support plates extending rearward on both sides of the hook stem, wherein behind the hook stem, arranged between the support plates, there is a transverse delay cylinder parallel to the fastening shaft of the safety latch, a piston rod of the cylinder being arranged to extend through a hole made to one support plate, the projecting end of the piston rod being provided with a press button extension, an associated thick piston rod portion, whose diameter is substantially equal to the diameter of said hole, a conically narrowing portion after the thick portion and a thin piston rod portion associated with the narrowing portion, wherein mounted on bearings on the surface of the support plate provided with the hole there is a locking cam plate pivoting in the direction of the surface, a locking cam of the plate being arranged to be capable of co-operation with a locking slot provided in the side edge on the same side of the safety latch while on the opposite side in relation to a bearing shaft of the plate there is a hole coinciding with the hole of the support plate and having a shape conforming with that of the hole in the support plate and the shape of the thick piston rod portion, and a spring arranged between the bearing shaft and the locking cam plate to force the locking cam from the locking slot to a releasing direction, and whereby with the piston rod of the delay cylinder pressed in and the locking cam co-operating with the locking slot, the safety latch remains in the open position but is released to the closed position as the thin piston rod portion of the delay cylinder reaches the hole in the locking cam plate, causing the locking cam to be released from the locking slot.

9. A lifting hook comprising:

a hook body with a hook stem and a hook tip, the hook body and the hook tip defining a hook jaw therebetween; and the safety latch according to claim 8.

10. The safety latch as claimed in claim 8, wherein the mounting part comprises a band to be fastened around the lifting hook stem or the top part of the hook body, a bent projection made to the band being provided with a hole for the fastening shaft of the safety latch.

11. A safety latch to be used in a lifting hook having a hook body with a hook stem and a hook tip, the hook body and the hook tip defining a hook jaw therebetween, the safety latch being arrangeable to a mounting part arranged to be fastened close to the hook stem and the safety latch being provided with a fastening end and a free latch end, the fastening end of the latch being pivotally fastened to the mounting part to be moved between an open and a closed position, the safety latch being in its opened position substantially against an inner side of the hook body in a position that leaves the hook jaw free while in the closed position of the safety latch the latch end extends across the hook jaw to the tip of the hook, resting against it on the inner side of the hook body and its jaw, and closing the jaw; and an actuator of the safety latch arranged between the safety latch and the hook body, wherein the actuator of the safety latch comprises a delay mechanism configured to return the safety latch from the open position to the closed position in a delayed manner, tensioning of the delay mechanism to produce the energy required to return the delay mechanism being arranged to be carried out by the user and by a force produced by the user, wherein the actuator of the safety latch comprises a spring arranged between the safety latch and the mounting part to force the latch end to the closed position and the delay mechanism of the actuator comprise a mechanical pivot mechanism arranged to cooperate with the safety latch, the mechanism releasing the safety latch locked thereto according to a predetermined delay, wherein a fastening shaft of the safety latch mounted to the mounting part is provided with a support plate that extends along one side of the hook stem, wherein the rear part of the support plate being provided with a mechanical pivot mechanism, the body of the mechanism being fastened to the rear surface of the support plate, a pivot shaft projecting from the mechanism body to the front side of the support plate, the pivot shaft having a dished plate attached thereto, and fastened to an edge of the inner surface of the plate there is a tension and locking pin of the pivoting delay mechanism included in the mechanism body, and wherein the side edge on the same side of the safety latch is provided with a shaped locking groove arranged to co-operate with the pivot shaft and the tension and locking pin, the pivot mechanism being released from the locking groove after a delay determined by the pivot mechanism.

12. A lifting hook comprising:
a hook body with a hook stem and a hook tip, the hook body and the hook tip defining a hook jaw therebetween; and
the safety latch according to claim 11.

13. The safety latch as claimed in claim 11, wherein the mounting part comprises a band to be fastened around the lifting hook stem or the top part of the hook body, a bent projection made to the band being provided with a hole for the fastening shaft of the safety latch.

14. A safety latch to be used in a lifting hook having a hook body with a hook stem and a hook tip, the hook body and the hook tip defining a hook jaw therebetween,
the safety latch being arrangeable to a mounting part arranged to be fastened close to the hook stem and the safety latch being provided with a fastening end and a free latch end, the fastening end of the latch being pivotally fastened to the mounting part to be moved between an open and a closed position, the safety latch being in its opened position substantially against an inner side of the hook body in a position that leaves the hook jaw free while in the closed position of the safety latch the latch end extends across the hook jaw to the tip of the hook, resting against it on the inner side of the hook body and its jaw, and closing the jaw; and
an actuator of the safety latch arranged between the safety latch and the hook body,
wherein the actuator of the safety latch comprises a delay mechanism configured to return the safety latch from the open position to the closed position in a delayed manner, tensioning of the delay mechanism to produce the energy required to return the delay mechanism being arranged to be carried out by the user and by a force produced by the user,
wherein the actuator of the safety latch comprises a spring arranged between the safety latch and the mounting part to force the latch end to the closed position and the delay mechanism of the actuator comprise a mechanical pivot mechanism arranged to co-operate with the safety latch, the mechanism releasing the safety latch locked thereto according to a predetermined delay,
wherein a fastening shaft of the safety latch mounted to the hook stem is provided with a support plate that extends along one side of the hook stem, and
wherein the rear part of the support plate is provided with a mechanical pivot mechanism, the body of the mechanism being fastened to the rear surface of the support plate, the mechanism body being provided with a pivot shaft projecting to the front side of the support plate, and the pivot shaft being provided with a cogwheel fastened thereto and co-operating with a toothed bar fastened to a side edge on the same side of the safety latch, the safety latch closing as the toothed bar advances on the cogwheel as determined by the pivot mechanism.

15. A lifting hook comprising:
a hook body with a hook stem and a hook tip, the hook body and the hook tip defining a hook jaw therebetween; and
the safety latch according to claim 14.

16. The safety latch as claimed in claim 14, wherein the mounting part comprises a band to be fastened around the lifting hook stem or the top part of the hook body, a bent projection made to the band being provided with a hole for the fastening shaft of the safety latch.

17. A safety latch to be used in a lifting hook having a hook body with a hook stem and a hook tip, the hook body and the hook tip defining a hook jaw therebetween,
the safety latch being arrangeable to a mounting part arranged to be fastened close to the hook stem and the safety latch being provided with a fastening end and a free latch end, the fastening end of the latch being pivotally fastened to the mounting part to be moved between an open and a closed position, the safety latch being in its opened position substantially against an inner side of the hook body in a position that leaves the hook jaw free while in the closed position of the safety latch the latch end extends across the hook jaw to the tip of the hook, resting against it on the inner side of the hook body and its jaw, and closing the jaw; and
an actuator of the safety latch arranged between the safety latch and the hook body,
wherein the actuator of the safety latch comprises a delay mechanism configured to return the safety latch from the open position to the closed position in a delayed manner, tensioning of the delay mechanism to produce the energy required to return the delay mechanism being arranged to be carried out by the user and by a force produced by the user,
wherein the actuator of the safety latch comprises a spring arranged between the safety latch and the mounting part to force the latch end to the closed position and the delay mechanism of the actuator comprise a mechanical pivot mechanism arranged to co-operate with the safety latch, the mechanism releasing the safety latch locked thereto according to a predetermined delay,
wherein a fastening shaft of the safety latch mounted to the hook stem is provided with a support plate that extends along one side of the hook stem, and
wherein the rear part of the support plate is provided with a mechanical pivot mechanism, the body of the mechanism being fastened to the rear surface of the support plate, the mechanism body being provided with a pivot shaft projecting to the front side of the support plate, and the pivot shaft being provided with a band winding thereto, one end of the band being fastened to a side edge on the same side of the safety latch, and as the band unwinds from the pivot shaft, it closes the safety latch according to a predetermined delay.

18. A lifting hook comprising:
a hook body with a hook stem and a hook tip, the hook body and the hook tip defining a hook jaw therebetween; and
the safety latch according to claim 17.

19. The safety latch as claimed in claim 17, wherein the mounting part comprises a band to be fastened around the lifting hook stem or the top part of the hook body, a bent projection made to the band being provided with a hole for the fastening shaft of the safety latch.

20. A safety latch to be used in a lifting hook having a hook body with a hook stem and a hook tip, the hook body and the hook tip defining a hook jaw therebetween,
wherein the safety latch being arrangeable to a mounting part arranged to be fastened close to the hook stem and the safety latch being provided with a fastening end and a free latch end, the fastening end of the latch being pivotally fastened to the mounting part to be moved between an open and a closed position, the safety latch being in its opened position substantially against an inner side of the hook body in a position that leaves the hook jaw free while in the closed position of the safety latch the latch end extends across the hook jaw to the tip of the hook, resting against it on the inner side of the hook body and its jaw, and closing the jaw; and an actuator of the safety latch arranged between the safety latch and the hook body,
wherein the actuator of the safety latch comprises a delay mechanism configured to return the safety latch from the open position to the closed position in a delayed manner, tensioning of the delay mechanism to produce the energy required to return the delay mechanism being arranged to be carried out by the user and by a force produced by the user, and
wherein the delay mechanism of the actuator comprises a load detector arranged to the bottom of the hook body for immediately releasing the safety latch when the load detector is activated due to a load attached to the hook.

21. A lifting hook comprising:
a hook body with a hook stem and a hook tip, the hook body and the hook tip defining a hook jaw therebetween; and
the safety latch according to claim 20.

22. The safety latch as claimed in claim 20, wherein the mounting part comprises a band to be fastened around the lifting hook stem or the top part of the hook body, a bent projection made to the band being provided with a hole for the fastening shaft of the safety latch.

* * * * *